United States Patent [19]
Gil et al.

[11] Patent Number: 5,753,904
[45] Date of Patent: May 19, 1998

[54] TOOL FOR DETECTING MISSING BALLS USING A PHOTODETECTOR

[75] Inventors: Jorge Carlos Gil; Peter Lewis Ebbitt, both of Boca Raton; Richard George Musco, Lake Worth; Thomas John Pack, Boca Raton, all of Fla.

[73] Assignee: Motorola, Inc., Schaumburg, Ill.

[21] Appl. No.: 581,697

[22] Filed: Dec. 29, 1995

[51] Int. Cl.$^6$ ............................. B23K 1/00; B23K 3/00
[52] U.S. Cl. ................................. 250/222.1; 250/208.2
[58] Field of Search ........................... 250/222.1, 208.2

[56] References Cited

U.S. PATENT DOCUMENTS

| | | | |
|---|---|---|---|
| 4,302,105 | 11/1981 | Sick | 356/237 |
| 4,559,451 | 12/1985 | Curl | 250/560 |
| 4,994,667 | 2/1991 | Brown et al. | 250/223 R |
| 5,058,178 | 10/1991 | Ray | 382/8 |
| 5,068,537 | 11/1991 | Ishikawa et al. | 250/342 |
| 5,205,896 | 4/1993 | Brown et al. | 156/297 |
| 5,372,294 | 12/1994 | Gore et al. | 228/105 |
| 5,389,789 | 2/1995 | Nguyen | 250/341.1 |
| 5,441,195 | 8/1995 | Tustaniwskyj et al. | 228/180.22 |
| 5,447,159 | 9/1995 | Schultz | 128/665 |
| 5,465,152 | 11/1995 | Bilodeau et al. | 356/371 |
| 5,467,913 | 11/1995 | Namekawa et al. | 228/41 |
| 5,601,229 | 2/1997 | Nakazato et al. | |
| 5,615,823 | 4/1997 | Noda et al. | |

*Primary Examiner*—Edward P. Westin
*Assistant Examiner*—Kevin Pyo
*Attorney, Agent, or Firm*—John B. MacIntyre; Douglas D. Fekete

[57] ABSTRACT

A tool (10) is effective to carry balls (30) and to detect any balls missing from the tool (10). The tool (10) includes a housing (12) that includes a face plate (16) that has a plurality of bores (18) extending between an inner face (22) and an outer face (24) opposite the inner face (22). The bores (18) each have a concave seat that is sized and shaped to receive a ball (30). The housing (12) defines a chamber (14) that prevents light from entering except through the bores (18). The housing (12) further includes a photodetector (20) within the chamber (14) to receive light that passes through the bores (18), which indicates the absence of a ball from the face plate (16).

12 Claims, 1 Drawing Sheet

FIG. 1

TOOL FOR DETECTING MISSING BALLS USING A PHOTODETECTOR

FIELD OF THE INVENTION

This invention relates generally to a tool that carries balls. More particularly, this invention relates to such a tool that uses a photodetector to detect missing balls in the tool.

BACKGROUND OF THE INVENTION

In order to minimize the size and weight of a microelectronic device, integrated circuit components have been directly attached to bond pads on printed circuit boards by solder bump interconnections. Solder bump interconnections are formed by superposing bond pads on a component with bond pads on a printed circuit board with solder bumps therebetween and reflowing the solder bumps to form the desired interconnections. The bond pads on the integrated circuit component must reliably connect with the bond pads on the printed circuit board. For this reason, solder balls must be reliably deposited onto all bond pads of the integrated circuit die or the printed circuit board such that a solder bump interconnection is formed between the bond pads on the die and the bond pads on an attached integrated circuit component.

It is known to use a tool, such as a vacuum pickup tool, to carry solder balls and concurrently place the balls onto the bond pads of an integrated circuit die or printed circuit board. If a solder ball is not picked up by the tool, no solder ball will be deposited at the corresponding bond pad. Consequently, no interconnection can be made at that site between the bond pads, and a reliable connection between the die and the board cannot be formed.

Currently, different solutions have been proposed to detect missing solder balls. One solution uses a machine vision system that captures a picture of the tool after picking up the solder balls and compares the image to a desired image. This solution is expensive and relatively slow, and requires indexing to be done between the machine vision system and the pickup tool.

Therefore, a need exists for a tool that is effective in picking up solder balls and is effective to reliably deposit them onto a printed circuit board or an integrated circuit die. Further, a need exists for a tool that detects when a solder ball is missing from the tool.

BRIEF DESCRIPTION OF THE DRAWINGS

FIG. 1 is a cross-sectional view of a tool for detecting missing balls using a photodetector in accordance with a preferred embodiment of the present invention.

DETAILED DESCRIPTION OF A PREFERRED EMBODIMENT

The present invention provides a tool for carrying balls. The tool includes a face plate and a housing that defines a chamber. The face plate has an inner face and an outer face opposite the inner face. The housing also includes bores that extend between the inner face and the outer face. Each bore has a concave seat that is sized and shaped to receive a ball, such as a solder ball. The housing also includes a photodetector within the chamber to receive light that passes through the bores. In this manner, the tool is able to detect when a solder ball is missing from a bore by detecting light passing through a bore and is able to pick up more balls to assure that each bore has received a ball.

Figure 1:
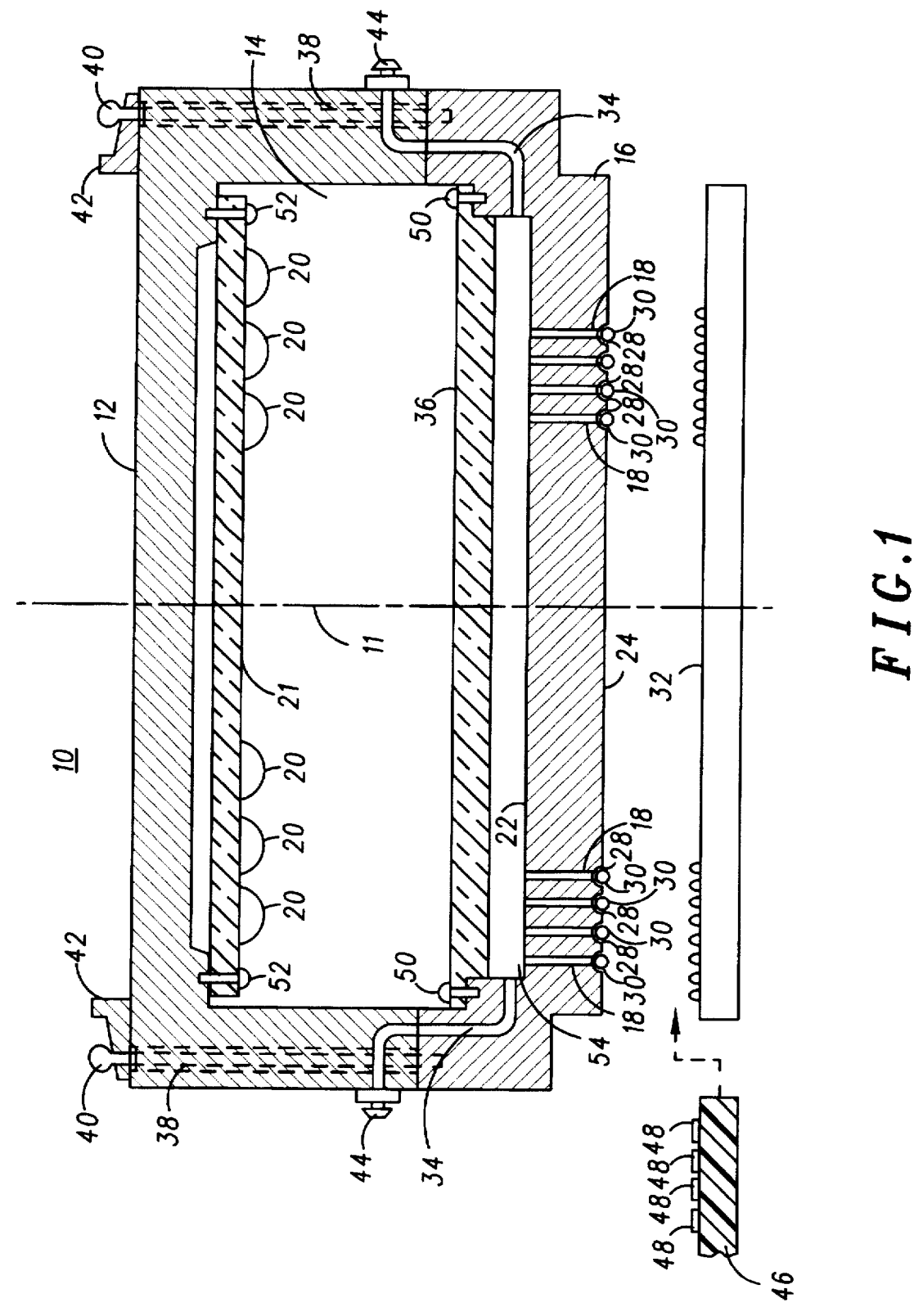

A preferred embodiment of the present invention can be further understood with reference to FIG. 1. Tool 10 is effective in picking up a plurality of solder balls 30 and placing them onto bond pads 48 on a printed circuit board 46 or an integrated circuit die. Typical solder balls 30 have a diameter greater than about 0.5 millimeters and are commercially available. Tool 10 comprises a housing 12 that defines a chamber 14. Housing 12 is affixed to face plate 16 by a plurality of locking shafts 38. Locking shafts 38 pass through bores in housing 12 and are attached thereto by securing locking pins 40 within locking mechanisms 42. In a preferred embodiment, a hermetic chamber is formed by sealing, with an o-ring or the like, the interface between housing 12 and face plate 16 to prevent ambient light from entering chamber 14 and striking a photodetector 20.

Face plate 16 includes an inner face 22 and an outer face 24, opposite inner face 22. In a preferred embodiment, a vertical axis 11 is shown perpendicular to inner face 22 and outer face 24. As shown in FIG. 1, a plurality of bores 18 are formed in face plate 16 and coaxially extend between inner face 22 and outer face 24. Each bore 18 has a concave seat 28 at outer face 24 that is sized and shaped to receive a ball 30, such as a solder ball. Seat 28 is concave to match the curvature of ball 30 to minimize or substantially prevent light from entering chamber 14 through a bore 18 when the bore has engaged a solder ball 30. In this manner, when each bore 18 has engaged a ball 30, chamber 14 will be substantially hermetically sealed. Preferably, bores 18 have a diameter less than the diameter of balls 30 to minimize the possibility that balls 30 will pass through bores 18, and rather will be held by concave seat 28 of bores 18 during processing. By way of an example of a preferred embodiment, bores 18 have a diameter of about 0.37 millimeters.

In a preferred embodiment, balls 30 are lodged against concave seat 28 and are drawn from a container of loose solder balls in response to reduced gas pressure within chamber 14. Chamber 14 is connected to a remote air pump through vacuum ports 34. Vacuum ports 34 have a vacuum fitting 44 opposite chamber 14 that is sized and shaped to receive a vacuum hose that is effective to evacuate chamber 14 and to reduce gas pressure within face plate 16 to produce a gas flow through bores 18, which in turn is effective to produce a force sufficient to carry balls 30.

A plurality of photodetectors 20 are mounted onto photodetector substrate 21, which is secured to housing 12 by a plurality of screws 52 or equivalents thereof. More specifically, a plurality of large area planar silicon photodetectors 20 are mounted on a two lead ceramic substrate 21. Photodetectors 20 comprise a clear molded lens that is used to increase the sensitivity of photodetectors 20. Such a photodetector is available from EG&G Vactec under the trade name VTP1188. In order to provide maximum coverage, a plurality of photodetectors 20 are arranged in an array facing inner face 22 and are staggered to assure each bore 18 has at least one photodetector 20 aligned with it. In this arrangement, photodetectors 20 are effective in receiving light that passes through bores 18 to detect any bores that have not engaged solder balls.

In a preferred operation, a remote air pump reduces gas pressure within chamber 14. The reduced air pressure leads to a vacuum force being applied through bores 18 located within face plate 16. Next, the face plate is passed over a bin of balls, preferably a bin of solder balls. The vacuum force within bores 18 is sufficient to pick up balls 30 and carry them to a printed circuit board 46 or integrated circuit die for forming a solder bump. However, in order to form reliable solder bumps, a solder ball must be deposited onto every bond pad 48 on the die or the printed circuit board 46.

After receiving balls 30 from the bin, housing 12 is passed over a light source 32, which illuminates face plate 16. In a preferred embodiment, light source 32 is an infrared light source. An infrared light source is used to reduce the effect of ambient, visible light that could enter the chamber through any openings in the tool that could actuate one of the photodetectors 20. If each bore has engaged a solder ball, no light will enter chamber 14, which is preferably hermetically sealed. If any bore did not pick up a solder ball, light will enter the chamber through the bore and will be detected by a photodetector 20.

In a preferred embodiment, the light that emanates from a bore that has not engaged a ball is collimated light. A diffuser 36 can be mounted to face plate 16 by a plurality of screws 50. Diffuser 36 is effective to diffuse the collimated light to increase the number of photodetectors 20 that are exposed to the light passing through the bore. In this manner, the detection of a missing ball is made more reliable by increasing the number of photodetectors 20 that will detect the missing ball. Diffuser 36 is effective to divide chamber 14 into a first portion 54 and a second portion 56. First portion 54 is in communication with vacuum means 34.

Thereafter, face plate 16 can again be passed over the bin of solder balls to pick up additional solder balls 30. After picking up additional solder balls 30, housing 12 is again passed over light source 32 for detection of missing solder balls. This sequence continues until no light passes through bores 18 into chamber 14 to actuate photodetector 20, at which time the housing proceeds to a station to deposit the balls 30 onto bond pads 48 of an integrated circuit die, a printed circuit board 46, or the like. In this manner, tool 10 detects missing solder balls and if necessary picks up additional solder balls 30 to ensure that a correct number of solder balls are picked up for depositing onto bond pads 48 of a printed circuit board 46 or an integrated circuit die. Tool 10 can contribute to providing more reliable solder connections, by ensuring that each bond pad 48 has a solder ball deposited thereon.

In an alternate embodiment, tool 10 can receive balls 30 in concave seats 28 of bores 18 on an upwardly facing face plate 16. More specifically, this embodiment involves rotating FIG. 1, about 180°, to allow balls 30 to be carried via gravity on face plate 16. Face plate 16 has a plurality of bores 18 that extend between outer face 24 and inner face 22. Bores 18 are sized and shaped to secure solder balls 30. Solder balls 30 are held in concave seats 28 of face plate 16 by the force of gravity. A plurality of photodetectors 20 are located within chamber 14 and are effective in detecting light that enters chamber 14 through bores 18. Solder balls 30 are deposited onto face plate 16 and face plate 16 is passed under a light source 32. If each bore 18 has engaged a solder ball 30, no light will enter chamber 14, which indicates that the proper number of solder balls 30 have been received and are ready to be deposited onto bond pads 48 on a printed circuit board 46, an integrated circuit die, or the like. If any bore 18 did not receive a solder ball 30, light will enter chamber 14 through the bore and, after passing a diffuser 36, will be detected by one of the photodetectors 20. Additional solder balls 30 are then deposited onto face plate 16. Housing 12 is then passed under light source 32 again. This process continues until no light enters chamber 14 through bores 18, which indicates that each bore 18 has received a ball 30. In this manner, tool 10 detects missing solder balls 30 to ensure that a correct number of solder balls 30 are deposited onto bond pads 48 of a printed circuit board 46, an integrated circuit die, or the like. This leads to more reliable solder connections.

The present invention provides a tool that is effective in carrying balls, such as solder balls. A housing comprises a face plate that has a plurality of bores formed therein. The bores are effective in receiving and carrying a plurality of balls. The housing is passed over or under a light source, such as an infrared light source, that illuminates the face plate. Any light that passes through the bores will be sensed by a photodetector located inside the housing. The presence of light passing through the bores indicates that a solder ball has been missed and that more solder balls need to be received by the face plate. The photodetector, in detecting missing solder balls, provides more reliable solder connections by assuring that the proper number of solder balls have been received. This provides for the proper number of solder balls to be deposited onto bond pads located on a printed circuit board or integrated circuit die to ensure a reliable solder bump interconnection.

While this invention has been described in terms of certain examples thereof, it is not intended that it be limited to the above description, but rather only to the extent set forth in the claims that follow.

The embodiments of this invention in which an exclusive property or privilege is claimed are defined as follows:

1. A tool for carrying balls comprising:

a housing defining a chamber, the housing comprising a face plate having an inner face, an outer face opposite the inner face, and a plurality of bores that extend between the inner face and the outer face and are sized and shaped to each receive a ball;

a photodetector disposed within the chamber to receive light passing through the bores; and a diffuser intermediate the face plate and the photodetector, said diffuser dividing the chamber into a first portion and a second portion.

2. A tool in accordance with claim 1, wherein the photodetector detects light within the infrared spectrum.

3. A tool in accordance with claim 1, further comprising means for evacuating the chamber.

4. A tool in accordance with claim 1, wherein the bores extend coaxially within the face plate.

5. A tool in accordance with claim 1, further comprising a plurality of photodetectors arranged in an array facing the inner face.

6. A tool in accordance with claim 1, wherein the light emanates from the face plate as collimated light.

7. A tool for carrying balls comprising:

a housing defining a chamber, the housing comprising a face plate having an inner face and an outer face opposite the inner face, the housing further comprising a plurality of coaxial bores suitable to admit light to the chamber, each bore having a concave seat adjacent the outer face that is sized and shaped to receive a ball such that the ball blocks light from passing through the bore;

a diffuser disposed in the chamber, said diffuser dividing the chamber into a first portion adjacent the face plate and a second portion; and a plurality of photodetectors within the second portion facing the diffuser to receive light passing through the bores and diffused by said diffuser.

8. A tool in accordance with claim 7, further comprising means for evacuating the chamber, said means for evacuating being in communication with the first portion.

9. A tool in accordance with claim 7, wherein the photodetector detects light within the infrared spectrum.

10. A tool in accordance with claim 7, further comprising a plurality of photodetectors arranged in an array facing the inner face.

11. A tool for carrying balls comprising:

a housing defining a chamber, the housing comprising a face plate having an inner face and an outer face opposite the inner face, the housing further comprising a plurality of coaxial bores suitable to admit light to the chamber, each bore having a concave seat adjacent the outer face that is sized and shaped to receive a ball in response to reduced gas pressure within the chamber such that the ball blocks light from passing through the bore to indicate the absence of a ball within the bore;

a diffuser to diffuse the light passing through the bores, said diffuser effective to divide the chamber into a first portion and a second portion;

a plurality of photodetectors within the chamber facing the inner face to receive light passing through the bores; and means for evacuating the chamber, said means for evacuating being effective to evacuate air from the first portion of the chamber.

12. A tool in accordance with claim 1, further comprising vacuum means in communication with the first portion.

* * * * *